(12) United States Patent  
Sapienza et al.

(10) Patent No.: US 9,347,482 B2  
(45) Date of Patent: May 24, 2016

(54) METHOD AND SYSTEM FOR TENSIONING PARK BRAKE CABLES

(71) Applicant: GM GLOBAL TECHNOLOGY OPERATIONS LLC, Detroit, MI (US)

(72) Inventors: Raymond J. Sapienza, Fenton, MI (US); Robbie D. Cannon, Clio, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 79 days.

(21) Appl. No.: 13/736,186

(22) Filed: Jan. 8, 2013

(65) Prior Publication Data

US 2014/0190290 A1 Jul. 10, 2014

(51) Int. Cl.
*B29C 65/00* (2006.01)
*B29C 65/02* (2006.01)
(Continued)

(52) U.S. Cl.
CPC . *F16C 1/22* (2013.01); *B60T 7/107* (2013.01); *B60T 7/108* (2013.01); *B60T 11/046* (2013.01); *F16D 65/46* (2013.01); *B29C 65/485* (2013.01); *B29C 66/9221* (2013.01); *B29C 66/959* (2013.01); *F16C 1/223* (2013.01); *F16C 2231/00* (2013.01); *F16D 2125/40* (2013.01); *Y10T 74/18576* (2015.01); *Y10T 74/20462* (2015.01)

(58) Field of Classification Search
CPC ........ B29C 66/00; B29C 66/90; B29C 66/92; B29C 66/9221; B29C 66/92211; B29C 66/95; B29C 66/959; B29C 66/1122; B29C 66/5221; B29C 65/00; B29C 65/48; B29C 65/4805; B29C 65/483; C09J 163/00; F16C 1/10; F16C 1/22; F16C 1/223; F16C 1/12; F16C 1/18; F16D 65/48; F16D 65/66; B60T 11/04; B60T 1/046

USPC ........ 156/60, 64, 91, 92, 293, 294, 325, 326, 156/327, 330, 378; 74/89.23, 313 R, 815, 74/816, 817, 819, 469, 491, 500.5, 501.6, 74/502.2, 502.6, 512; 188/2 R, 2 D, 74, 188/79.51, 79.54, 79.57, 79.58, 196 R, 188/196 M, 196 B, 196 BA; 81/57.38

See application file for complete search history.

(56) References Cited

U.S. PATENT DOCUMENTS 4,379,500 A * 4/1983 Kamino ..................... 188/196 B
2003/0075001 A1 * 4/2003 Petrak ...................... 74/501.5 R
(Continued)

FOREIGN PATENT DOCUMENTS

CN 101317024 A 12/2008
KR 1176468 B1 * 8/2012 ............. B60T 13/74

*Primary Examiner* — Philip Tucker
*Assistant Examiner* — Brian R Slawski
(74) *Attorney, Agent, or Firm* — Quinn Law Group, PLLC

(57) ABSTRACT

A method of tensioning a park brake system of a vehicle includes providing an adjustment mechanism having a nut in threaded engagement with a rod that defines a signal to noise ratio therebetween. The nut is advanced on the rod to remove slack until torque applied to the nut indicates that the park cables include a tension equal to an offset tension level. The nut is then retracted on the rod to introduce slack into the park cables and reduce the tension in the park cables to a target slack tension level. A signal to noise ratio between the nut and the rod is improved so that the cable tension may be predicted by the torque required to turn the nut on the rod, thereby allowing a torque indicating tool to measure the tension in the park cables my measuring the torque required to turn the nut on the rod.

12 Claims, 3 Drawing Sheets

(51) Int. Cl.

| | | |
|---|---|---|
| *B32B 37/00* | (2006.01) | |
| *B32B 38/00* | (2006.01) | |
| *B32B 7/04* | (2006.01) | |
| *F16C 1/12* | (2006.01) | |
| *F16D 65/14* | (2006.01) | |
| *F16D 65/42* | (2006.01) | |
| *B25B 17/00* | (2006.01) | |
| *B25B 29/02* | (2006.01) | |
| *F16C 1/22* | (2006.01) | |
| *B60T 7/10* | (2006.01) | |
| *B60T 11/04* | (2006.01) | |
| *F16D 65/46* | (2006.01) | |
| *B29C 65/48* | (2006.01) | |
| *F16D 125/40* | (2012.01) | |

(56) References Cited

U.S. PATENT DOCUMENTS

| | | | |
|---|---|---|---|
| 2003/0146058 A1* | 8/2003 | Mai et al. | 188/196 F |
| 2005/0145444 A1 | 7/2005 | Petrak | |
| 2006/0053938 A1* | 3/2006 | Sullivan | 74/501.6 |
| 2009/0031868 A1 | 2/2009 | Petrak | |

* cited by examiner

METHOD AND SYSTEM FOR TENSIONING PARK BRAKE CABLES

TECHNICAL FIELD

The invention generally relates to a park brake system of a vehicle, and more specifically to a method of tensioning park brake cables of the park brake system.

BACKGROUND

Vehicular parking brakes use a cable system to manually engage and release the brakes. The park brake system includes an actuation lever, such as but not limited to a handle or foot lever, for actuating a plurality of cables. The actuation lever is coupled to a front or first cable. A connecting device couples the front cable to a left rear or second cable, and a right rear or third cable. The left rear cable extends from the connecting device to a left rear brake, and the right rear cable extends from the connecting device to a right rear brake. An adjustment mechanism interconnects the actuation lever and the front cable for adjusting tension in the plurality of cables. Tightening the adjustment mechanism shortens the effective length of the first cable, thereby increasing the tension in the park cables. In contrast, loosening the adjustment mechanism lengthens the effective length of the first cable, thereby decreasing the tension in the park cables.

When the park brake system is actuated, i.e., disposed in an applied position, then the park cables are tensioned to a level sufficient to engage the brakes of the vehicle. When the park brake system is disengaged, slack is introduced into the park cables to reduce the tension in the park cables. Accordingly, when the park brake system is disengaged, the park brake system may be referred to as being in a slack position, and the amount of tension in the cables when disposed in the slack position may be referred to as a target slack tension level.

The park cables must be properly tensioned to function properly. The lever or handle moves the park cables a pre-defined distance when moving from the slack position to the applied position in order to obtain the requisite tension level in the park cables. If the park cables include excess slack, i.e., if the park cables are too long, then the park brake system will fail to achieve the requisite tension level and will not apply enough force to the brakes to properly engage the brakes. In contrast, if the park cables do not include enough slack, i.e., if the park cables are too short, then the park cables will be excessively tensioned, and will create brake drag, i.e., a continuously applied braking force. Accordingly, the tension of the park cables, i.e., the length of the park cables when in the slack position, must be properly set to the target slack tension level in order for the park brake system to function properly.

SUMMARY

A method of tensioning a park brake system of a vehicle is provided. The method includes providing an adjustment mechanism having a threaded nut in threaded engagement with a threaded rod. The threaded nut and the threaded rod define a signal to noise ratio between the threaded nut and the threaded rod. The signal to noise ratio allows tension measurement of a plurality of park cables based upon a torque applied to the threaded nut. Torque applied to the threaded nut is measured with a torque indicating tool while advancing the threaded nut on the threaded rod to remove slack and tighten the plurality of park cables. The threaded nut is advanced until the measured torque indicates that the plurality of park cables include a tension equal to an offset tension level. The threaded nut is then retracted on the threaded rod to introduce slack into the park cables and reduce the tension in the park cables to a target tension level.

A park cable system for a vehicle is also provided. The park cable system includes an actuation lever, a first cable having a first end and a second end, and an adjustment mechanism interconnecting the actuation lever and the first cable. The adjustment mechanism includes an adjustment nut coupled to the actuation lever, and a rod coupled to the first end of the first cable, and disposed in threaded engagement with the adjustment nut. Advancing the adjustment nut on the rod decreases a length between the actuation lever and the second end of the first cable, which increases a tension of the first cable. Retracting the adjustment nut on the rod increases the length between the actuation lever and the second end of the first cable, which decreases the tension of the first cable. The adjustment nut and the rod include a course thread form as defined under the Unified Thread Standard, such that advancing the adjustment nut along the rod defines a signal to noise ratio therebetween, as calculated by the Nominal—The Best Type 1 method, that is equal to or greater than 25 dB with a standard deviation equal to or less than 75 Newtons, and allows tension measurement of the first cable based upon a torque applied to the adjustment nut.

Accordingly, the course pitch thread form of the course threaded adjustment nut and the course threaded rod reduce the mechanical advantage of the thread form, which in turn improves the signal to noise ratio between the course threaded adjustment nut and the course threaded rod so that the cable tension may be measured by the torque required to turn the adjustment nut on the rod. The torque required to turn the adjustment nut on the rod may be directly measured by the torque indicating tool, such as but not limited to a torque wrench or the like, used to advance the adjustment nut on the rod. Accordingly, no special tools are needed to measure the tension in the park cables. It should be appreciated that the signal to noise ratio may be improved to a level sufficient to allow the cable tension to be measured by the torque required to turn the adjustment nut on the rod in some other manner, such as by introducing a lubricant between the adjustment nut and the rod. The two part epoxy adhesive, which may be applied to the threads of the adjustment nut and the threads of the rod, may act as a lubricant to reduce friction between the adjustment nut and the rod prior to curing, thereby allowing the torque indicating tool to more accurately measure the torque needed to turn the adjustment nut, and thereby measure the tension in the park cables.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward,"

"top," "bottom," etc., are used descriptively for the figures, and do not represent limitations on the scope of the invention, as defined by the appended claims.

Figure 1:
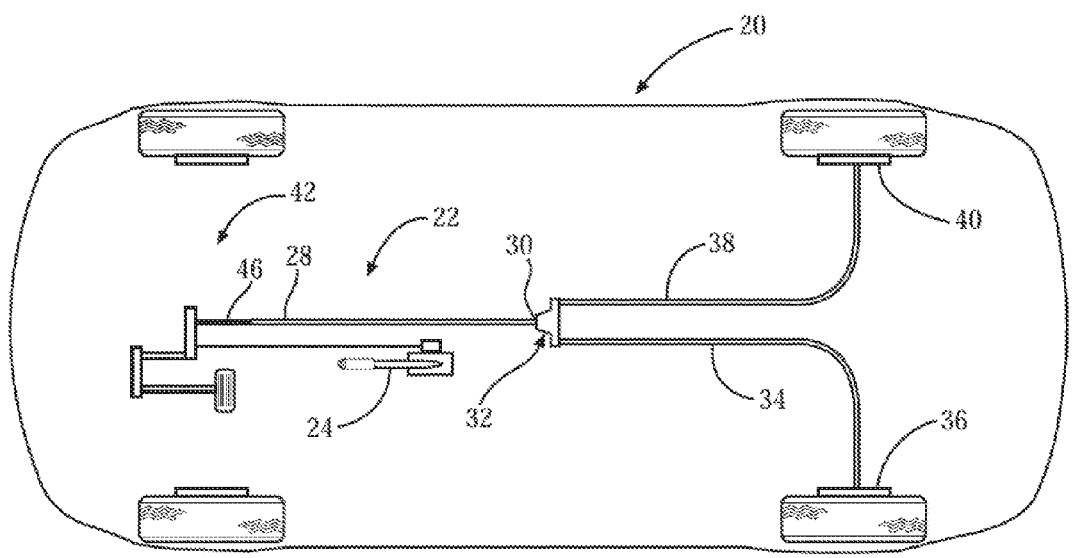
FIG. 1 is a schematic plan view of a vehicle showing a park brake system.

Referring to the Figures, wherein like numerals indicate like parts throughout the several views, a vehicle is generally shown at 20 in FIG. 1. Referring to FIG. 1, the vehicle 20 includes a park brake system 22 using a series of park cables 28, 34, 38 to manually engage and release brakes of the vehicle 20. The park brake system 22 may include an actuation lever 24, such as but not limited to a hand lever or a foot pedal that is coupled to a first end 26 of a front or first cable 28. A second end 30 of the first cable 28 is coupled to a connecting device 32. A left rear or second cable 34 extends from the connecting device 32 to a left rear brake 36, and a right rear or third cable 38 extends from the connecting device 32 to a right rear brake 40. As used herein, the term park cables include the first cable 28, the second cable 34 and the third cable 38. However, it should be appreciated that different configurations of the park brake system 22 may include a greater number of cables or a fewer number of cables, and that the term park cables may include more than or less than the three cables described above.

Figure 2:
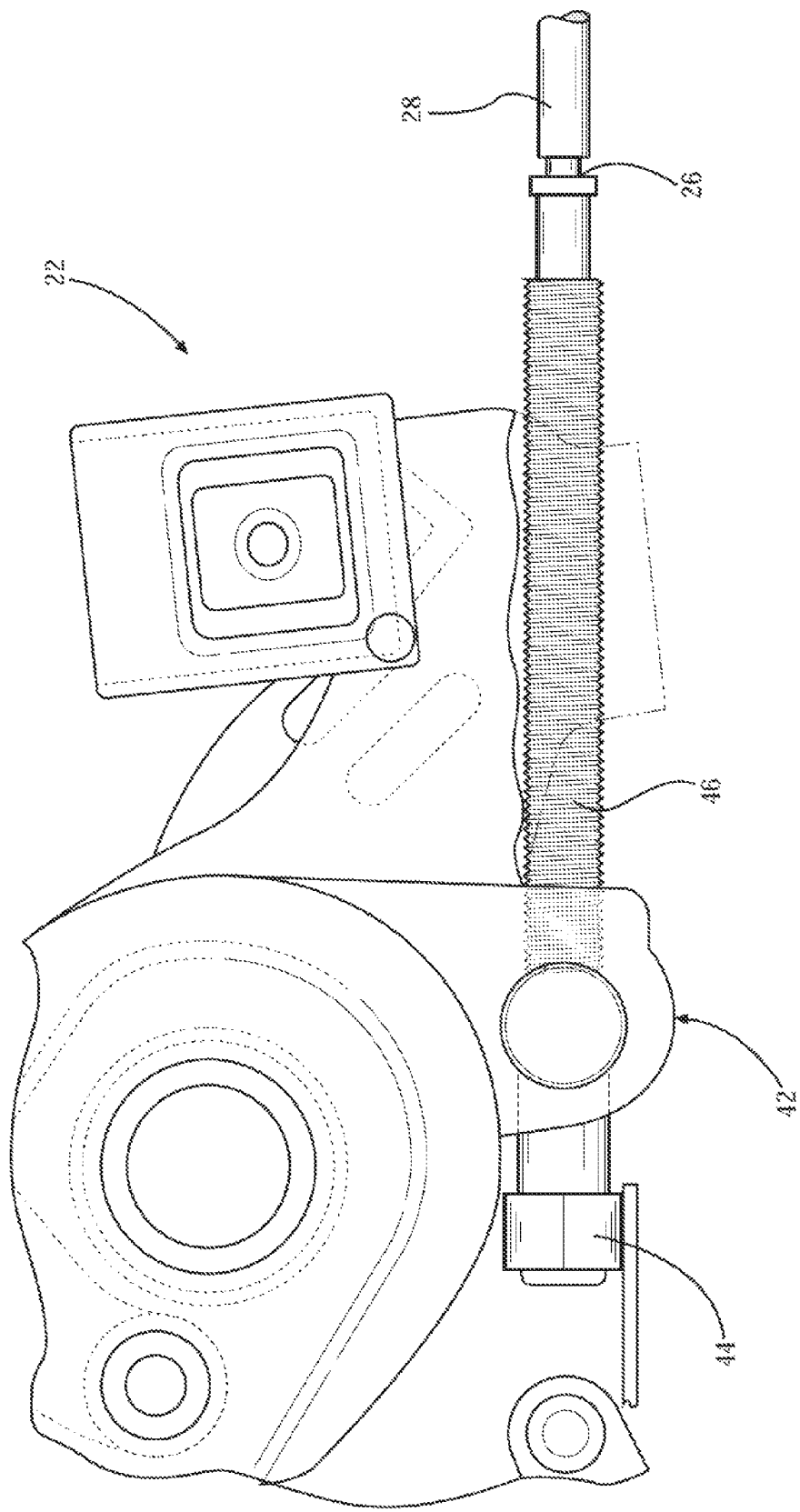
FIG. 2 is a schematic fragmentary plan view of the park brake system.

An adjustment mechanism 42 interconnects the actuation lever 24 and the first cable 28. Referring to FIG. 2, the adjustment mechanism 42 includes an adjustment nut 44 coupled to the actuation lever 24, and a rod 46 coupled to the first end 26 of the first cable 28. The rod 46 is disposed in threaded engagement with the adjustment nut 44. Tightening, i.e., advancing the adjustment nut 44 on the rod 46 shortens an effective length of the first cable 28, i.e., the length between the actuation lever 24 and the second end 30 of the first cable 28, thereby shortening the length of the cable system between the actuation lever 24 and the left rear brake 36 and the right rear brake 40, which increases the tension in the park cables 28, 34, 38. In contrast, loosening, i.e., retracting the adjustment nut 44 on the rod 46 lengthens the effective length of the first cable 28, thereby lengthening the length of the cable system between the actuation lever 24 and the left rear brake 36 and the right rear brake 40, which decreases the tension in the park cables 28, 34, 38.

Advancing the adjustment nut 44 along the rod 46 defines a signal to noise ratio between the threaded nut and the threaded rod. The signal to noise ratio is related to the variance or standard deviation in the amount of torque required to advance the adjustment nut 44 along the rod 46. As calculated by the Nominal—The-Best Type 1 method, a lower signal to noise ratio indicates a large variance or standard deviation in the amount of torque required to advance the adjustment nut 44 along the rod 46, and a higher signal to noise ratio indicates a small variance or standard deviation in the amount of torque require to advance the adjustment nut along the rod 44. If the signal to noise ratio is large enough, as calculated by the Nominal—The-Best Type 1 method, measurement of the torque applied to the nut becomes a predictable and consistent indicator of the amount of tension in the park cables 28, 34, 38, and may be used as an alternative form of tension measurement, i.e., the tension in the park cables 28, 34, 38 may be indirectly measured by the torque applied to the adjustment nut 44. Preferably, the signal to noise ratio is equal to or greater than 25 dB with a standard deviation equal to or less than 75 Newtons, and more preferably equal to or less than 50 Newtons, as calculated by the Nominal—The-Best Type 1 Method. However, it should be appreciated that the signal to noise ratio may differ from the exemplary values described above, and is dependent upon the specific components used in the park brake system.

The signal to noise ratio is defined by the equation:

$$S/N \cong 10 \operatorname{Log}\left(\frac{\bar{y}^2}{\sigma_{n-1}^2}\right);$$

wherein S/N is the signal to noise ratio, $\bar{y}$ is the mean of a plurality of measured cable tension values for a given torque input; and $\sigma_{n-1}$ is the standard deviation of the plurality of measured cable tension values for a given torque input.

The value of the standard deviation $\sigma_{n-1}$ may be calculated from the equation:

$$\sigma = \sqrt{\frac{\sum (y-\bar{y})^2}{(n-1)}};$$

wherein y is a measured cable tension value of a given torque, $\bar{y}$ is the mean of a plurality of measured cable tension values for a given torque input, and n is the total number of measured cable tension values in the sample.

Figure 3:
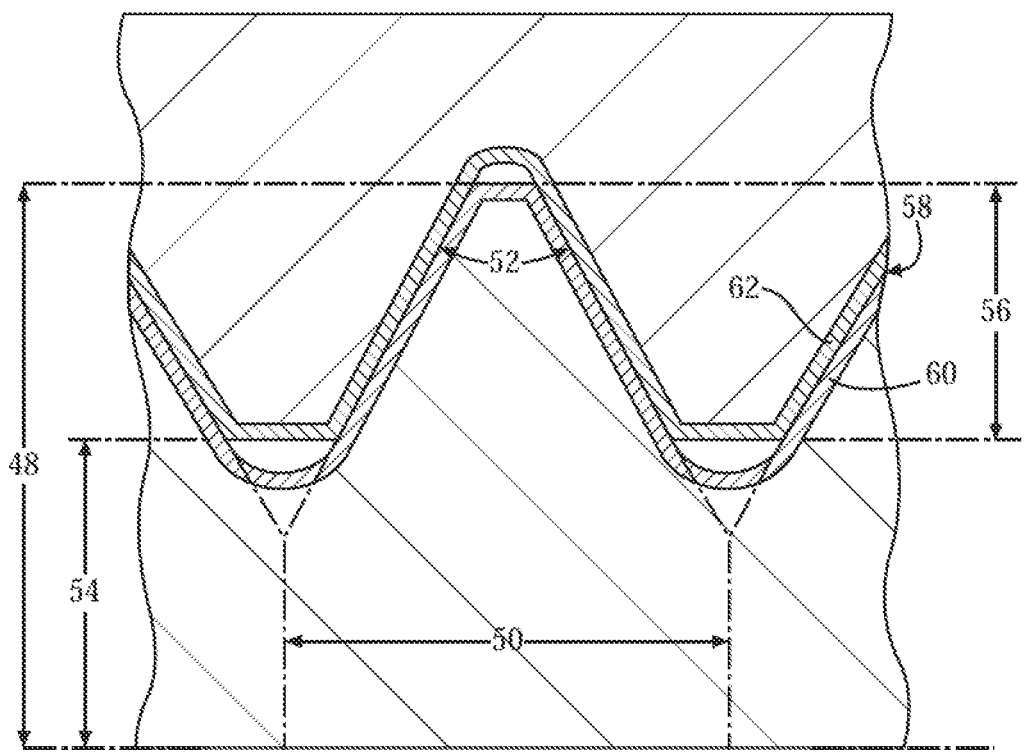
FIG. 3 is a schematic cross sectional view of a thread form of a course threaded adjustment nut and a course threaded rod of the park brake system.

Referring to FIG. 3, the adjustment nut 44 and the rod 46 include a course thread form as defined under the Unified Thread Standard. The thread form of the adjustment nut 44 and the rod 46 includes a pitch 50 equal to or greater than two millimeters (2 mm). The course thread form of the adjustment nut 44 and the rod 46 reduce the mechanical advantage of the thread form, allowing the tension in the park cables 28, 34, 38 to be measured by the amount of torque required to turn the adjustment nut 44 on the rod 46. Preferably, the course thread form is configured to require at least five Newton meters (5 NM) of torque to advance the adjustment nut 44 along the threaded rod 46.

The adjustment mechanism 42 may further include a securing mechanism 58 for securing a position of the adjustment nut 44 relative to the rod 46. The securing mechanism 58 may include any device capable of securing the adjustment nut 44 relative to the rod 46 once the adjustment nut 44 is properly positioned along the rod 46 to properly tension the park cables 28, 34, 38. For example, the securing mechanism 58 may include, but is not limited to, a two part epoxy adhesive for bonding the adjustment nut 44 to the rod 46. The two part epoxy adhesive includes a first component 60 and a second component 62. One of the first component 60 and the second component 62 may be applied to the threads of one of the adjustment nut 44 and the rod 46, and the other of the first component 60 and the second component 62 may be applied to the threads of the other of the adjustment nut 44 and the rod 46. Once mixed or otherwise brought together, the first component 60 and the second component 62 cure, thereby bonding the adjustment nut 44 and the rod 46 together. Curing of the two part epoxy adhesive may require a period of time, application of heat, or some other reactant to cause curing. Prior to curing the two part epoxy adhesive, the first component 60 and the second component 62 may act as a lubricant between the adjustment nut 44 and the rod 46 to reduce friction therebetween.

When the park brake system 22 is actuated, i.e., moved into an applied position, then the park cables 28, 34, 38 are ideally tensioned to a tension level sufficient to properly engage both the right rear brake 40 and the left rear brake 36 of the vehicle 20. When the park brake system 22 is disengaged, i.e., when the actuation lever 24 is released, slack is introduced into the park cables 28, 34, 38 to reduce the tension in the park cables 28, 34, 38 and disengage both the left rear brake 36 and the right rear brake 40. As such, when the park brake system 22 is disengaged, the park brake system 22 may be referred to as being in a slack position, and the amount of tension in the park cables 28, 34, 38 may be referred to as a target slack tension level 76.

A method of tensioning the park cables 28, 34, 38 to the target slack tension level 76 is provided. The target slack tension level 76 of the park cables 28, 34, 38 is the desired amount of tension in the park cables 28, 34, 38 when the park cables 28, 34, 38 are disposed in the slack position, i.e., the un-applied position. Accordingly, when actuated into an applied position, the park cables 28, 34, 38 should be tensioned to a tension level that is greater than the target slack tension level 76 and sufficient to properly engage the left rear brake 36 and the right rear brake 40.

Figure 4:
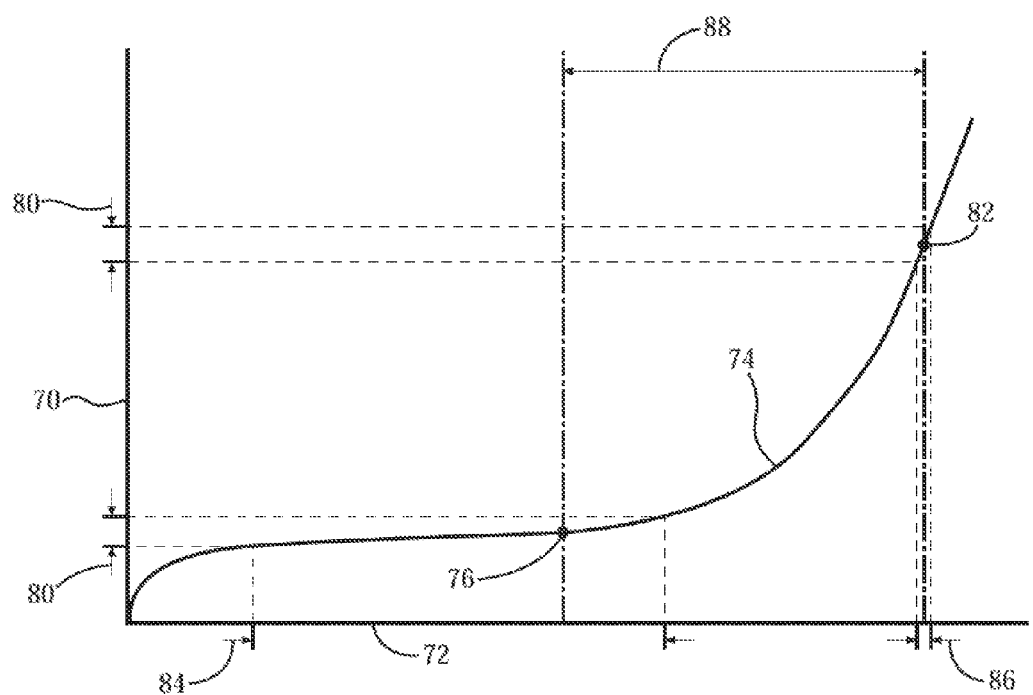
FIG. 4 is a graph showing the relationship between tension in park cables of the park brake system vs. adjustment distance of the park cables.

Referring to FIG. 4, a graph is shown representing the relationship between tension and adjustment distance of the park cables 28, 34, 38 of the park brake system 22. As shown in FIG. 4, the tension of the park cables 28, 34, 38 is generally indicated along a vertical axis 70, and the adjustment distance of the park cables 28, 34, 38 is generally indicated along a horizontal axis 72. The cable tension of the park cables 28, 34, 38 of the park brake system 22 is generally indicated by line 74, with the target slack tension level generally indicated by reference dot 76. The cable tension in the park cables 28, 34, 38 is measured with a tension indicating tool, such as a torque wrench or other similar tool. The tension indicating tool measures the tension in the park cables 28, 34, 38 by sensing the amount of torque required to turn the adjustment nut 44 on the rod 46. The tension indicating tool may sense the cable tension within a defined range or variance. This variance of the tension indicating tool is generally represented by the range indicated by reference numeral 80.

FIG. 4 shows the variance 80 in the tension indicating tool associated with measuring the cable tension at the target slack tension level 76, and also shows the variance 80 in the tension indicating tool associated with measuring the cable tension at an offset tension level, generally indicated by the reference dot 82. Because the slope of the cable tension of the park cables 28, 34, 38 is generally flat in the region bounding the target slack tension level 76, the variance 80 in the tension indicating tool provides for a large adjustment length, generally indicated at 84. Attempting to adjust the length of the park cables 28, 34, 38 to the target slack tension level 76 directly with the variance 80 associated with the tension indicating tool may result in the length of the park cables 28, 34, 38 being anywhere within the large adjustment length. Because the slope of the cable tension of the park cables 28, 34, 38 extends at a substantially vertical rate in the region bounding the offset tension level 82, the variance 80 in the tension indicating tool provides for a small adjustment length, generally indicated at 86. Adjusting the length of the park cables 28, 34, 38 to the offset tension level 82 directly with the variance 80 associated with the tension indicating tool may result in the length of the park cables 28, 34, 38 being anywhere within the small adjustment length. As such, adjusting the length of the park cables 28, 34, 38 to obtain the offset tension level 82 is much more precise than adjusting the length of the park cables 28, 34, 38 to obtain the target slack tension level 76. Once the length of the park cables 28, 34, 38 is adjusted to be within the small adjustment length associated with the offset tension level 82, the length of the park cables 28, 34, 38 may then be adjusted by a desired adjustment distance, generally indicted at 88, which relates the offset tension level 82 to the target slack tension level 76, i.e., the difference in the length of the park cables 28, 34, 38 between the offset tension level 82 and the target slack tension level 76, thereby transferring the more precise setting of the offset tension level 82 to the target slack tension level 76.

Accordingly, the method utilizes the strategy described above to set the tension of the park cables 28, 34, 38 when at a high tension level to minimize the effect of the variance 80 in the tension indicating tool, and then adjust the length of the park cables 28, 34, 38 by the desired adjustment distance 88 to achieve the target slack tension level 76.

The method includes determining the current position of the actuation lever 24. Once the current position of the actuation lever 24 is determined, then an appropriate pre-determined adjustment distance for the determined current position of the actuation lever 24 required to introduce the desired amount of slack into the plurality of park cables 28, 34, 38 for the current position of the actuation lever 24 may be identified. The pre-determined adjustment distance is the amount of cable length adjustment required to bring the tension of the park cables 28, 34, 38 from the offset tension level 82 down to the appropriate cable tension for the current position of the actuation lever 24. Preferably, the actuation level is positioned in a fully released position, so that the pre-determined adjustment distance is the amount of cable length adjustment required to bring the cable tension of the peak cables from the offset tension level 82 down to the target slack tension level 76. However, it should be appreciated that if the actuation lever 24 is disposed in a position other than the fully released position, then a pre-determined adjustment distance may be identified for such. For example, a pre-determined adjustment distance may be determined for each possible position of the actuation lever 24 through trial and error, and stored in a table. Therefore, once the current position of the actuation lever 24 is known, the pre-determined distance may easily be identified by reference to the table. It should be appreciated that the pre-defined adjustment distance will vary with each type and/or style of park brake system 22, and within each model of vehicle 20.

Prior to installing the adjustment nut 44 on the rod 46, and if the adjustment mechanism 42 includes the two part epoxy adhesive described above, then the method includes applying the first component 60 of the two part epoxy adhesive to one of the adjustment nut 44 and the rod 46, and applying a second component 62 of the two part epoxy adhesive to the other of the adjustment nut 44 and the rod 46.

The adjustment nut 44 is then installed on the rod 46, and the coarse threaded nut is advanced, i.e., tightened, on the rod 46. The torque applied to the adjustment nut 44 is measured with a torque indicating tool while the adjustment nut 44 is advanced on the rod 46 to remove slack and tighten the plurality of park cables 28, 34, 38. The adjustment nut 44 is advanced on the rod 46 with the torque indicating tool until the torque indicating tool indicates that the torque applied to the adjustment nut 44 is sufficient to indicate that the plurality of park cables 28, 34, 38 include a tension equal to the offset tension level 82 described above. The torque indicating tool may include, but is not limited to, a torque wrench or some other similar tool capable of reading the torque applied to the adjustment nut 44. Due to the low signal to noise ratio between the adjustment nut 44 and the rod 46, the torque applied to the adjustment nut 44 to turn the adjustment nut 44 on the rod 46 is approximately equal to the tension in the park cables 28, 34, 38. Accordingly, no other tools are required to sense and/or measure the tension in the park cables 28, 34, 38.

Once the adjustment nut 44 is advanced until the tension in the park cables 28, 34, 38 is at the offset tension level 82, then the adjustment nut 44 is retracted the identified pre-determined adjustment distance along a longitudinal axis. The adjustment nut 44 is retracted, i.e., loosened, along the rod 46 to introduce slack back into the park cables 28, 34, 38, and reduce the tension in the park cables 28, 34, 38 to a target tension level. The target tension level is the appropriate amount of tension in the park cables 28, 34, 38 for the current position of the actuation lever 24. Accordingly, if the actuation lever 24 is disposed in the fully released position, then the tension in the park cables 28, 34, 38 is reduced to the target slack tension level 76 described above.

Once the adjustment nut 44 is properly positioned along the rod 46 to introduce the target slack tension for the current position of the actuation lever 24, then the adjustment nut 44 may be secured relative to the rod 46. The adjustment nut 44 may be secured relative to the rod 46 in any suitable manner. For example, the adjustment nut 44 may be secured relative to the rod 46 by adhering the adjustment nut 44 to the rod 46. Adhering the adjustment nut 44 onto the rod 46 may include applying an adhesive to the threads of at least one of the adjustment nut 44 and the rod 46 prior to advancing the coarse threaded nut on the rod 46. As noted above, the adhesive may include the two part epoxy adhesive, which would then require that the two part epoxy adhesive be cured to adhere the adjustment nut 44 to the rod 46. It should be appreciated that an adhesive other than the exemplary two part epoxy adhesive described herein may be used to secure the adjustment nut 44 to the rod 46. Furthermore, it should be appreciated that the securing mechanism 58 may include some other device, such as a mechanical locking device capable of securing the adjustment nut 44 relative to the rod 46. For example, the securing mechanism 58 may include a jam nut tightened against the adjustment nut 44 to lock the adjustment nut 44 in position relative to the rod 46. It is contemplated that the tension indicating tool may be configured and used to install the jam nut against the adjustment nut 44 immediately after finally positioning the adjustment nut on the rod 46, in the same manufacturing operation.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of tensioning a park brake system of a vehicle, the method comprising:
   providing an adjustment mechanism having a threaded nut in threaded engagement with a threaded rod, wherein the threaded nut and the threaded rod define a signal to noise ratio therebetween that allows tension measurement of a plurality of park cables based upon a torque applied to the threaded nut;
   measuring torque applied to the threaded nut, while rotating the threaded nut relative to the threaded rod in a first rotational direction to advance the threaded nut on the threaded rod to remove slack and tighten the plurality of park cables, with a torque indicating tool until the measured torque indicates that the plurality of park cables include a tension equal to an offset tension level;
   rotating the threaded nut relative to the threaded rod in a second rotational direction, after the measured torque indicates that the plurality of park cables are tensioned to the offset tension level, to retract the threaded nut on the threaded rod to introduce slack into the park cables and reduce the tension in the park cables to a target tension level; and
   applying a first component of a two part epoxy adhesive to one of the threaded nut and the threaded rod, and applying a second component of the two part epoxy adhesive to the other of the threaded nut and the threaded rod, to adhere the threaded nut onto the threaded rod.

2. A method as set forth in claim 1 wherein the signal to noise ratio between the threaded nut and the threaded rod is calculated by the Nominal—The-Best Type 1 method and is defined by the equation:

$$S/N \cong 10 \operatorname{Log}\left(\frac{\bar{y}^2}{\sigma_{n-1}^2}\right)$$

wherein S/N is the signal to noise ratio, $\bar{y}$ is the mean of a plurality of cable tension values for a given torque input; and $\sigma_{n-1}$ is the standard deviation of the plurality of cable tension values for the given torque input.

3. A method as set forth in claim 2 wherein the signal to noise ratio is equal to or greater than 25 dB with a standard deviation equal to or less than 75 newtons.

4. A method as set forth in claim 1 wherein retracting the threaded nut on the threaded rod is further defined as retracting the threaded nut on the threaded rod a pre-determined adjustment distance along a longitudinal axis of the threaded rod, wherein the pre-determined adjustment distance is related to a current position of an actuation lever of the park brake system.

5. A method as set forth in claim 4 further comprising determining the current position of the actuation lever.

6. A method as set forth in claim 5 further comprising identifying the appropriate pre-determined adjustment distance for the determined current position of the actuation lever required to introduce the desired amount of slack into the plurality of park cables for the current position of the actuation lever.

7. A method as set forth in claim 4 further comprising securing the threaded nut relative to the threaded rod after the threaded nut is retracted the pre-determined adjustment distance on the threaded rod.

8. A method as set forth in claim 7 wherein securing the threaded nut relative to the threaded rod includes tightening a jam nut against the threaded nut to lock the position of the threaded nut relative to the threaded rod.

9. A method as set forth in claim 4 further comprising curing the two part epoxy adhesive after the threaded nut is retracted the pre-determined adjustment distance on the threaded rod.

10. A method as set forth in claim 1 wherein providing the adjustment mechanism having the threaded nut in threaded engagement with the threaded rod includes providing a lubricant between the threaded nut and the threaded rod to reduce friction between the threaded nut and the threaded rod to lower the signal to noise ratio therebetween.

11. A method as set forth in claim 1 wherein providing the adjustment mechanism having the threaded nut in threaded engagement with the threaded rod includes providing a coarse threaded nut and a coarse threaded rod including a thread form configured to require at least five newton meters (5 N-m) of torque to advance the threaded nut along the threaded rod.

12. A method as set forth in claim 11 wherein providing the adjustment mechanism having the threaded nut in threaded engagement with the threaded rod includes providing the coarse threaded nut and the coarse threaded rod including a thread form defining a pitch greater than two millimeters (2 mm).

* * * * *